Oct. 9, 1951 R. D. BREWER 2,570,315
MAGNETIC OPERATED SWITCH
Filed July 7, 1948

R D BREWER
INVENTOR.
BY E. C. McRae
J. R. Faulkner
T. H. Oster
ATTORNEYS

Patented Oct. 9, 1951

2,570,315

UNITED STATES PATENT OFFICE 2,570,315

MAGNETIC OPERATED SWITCH

Richard D. Brewer, Dearborn, Mich., assignor to Ford Motor Company, Dearborn, Mich., a corporation of Delaware Application July 7, 1948, Serial No. 37,460

4 Claims. (Cl. 200—103)

This invention is concerned with electrical regulators and more particularly with the vibrating reed type of regulator commonly employed to control electrical generating apparatus. While by no means so limited, this invention is particularly directed to apparatus employed to regulate the voltage and current output of vehicular generators.

Vehicular electrical generators are required by the nature of their duty to operate over a wide range of speeds and to work smoothly in conjunction with a lead acid storage battery. Due to the inherent characteristics of such lead acid storage batteries, the voltage supply to them must be narrowly controlled and the rate of charge definitely limited. Furthermore, both voltage and rate of charge must be further controlled in response to temperature conditions. To meet these rather rigorous requirements, the industry has developed the currently used "voltage regulator" in which are combined the apparatus for regulation of the voltage, for regulation of the amperage and for the elimination of reverse current flow from the battery to the generator. Despite the fact that endless efforts and expense have been lavished upon the design and perfection of these "voltage regulators," their construction is still expensive and complicated and they are a fertile source of trouble in an otherwise dependable electrical system. The operation of these "voltage regulators" is sufficiently obscure that the average service station is unable to make any reliable repairs upon them other than to substitute an entirely new unit.

Accordingly it is an object of this invention to provide a voltage regulator which is simple in construction and reliable in operation.

It is a further object of this invention to provide a voltage regulator in which repairs can readily be made by mechanics or pseudomechanics by simply replacing a single, economical unit.

It is a further object of this invention to provide a voltage regulator which is more economical to manufacture than those now in use.

With these and other objects in view, the invention comprises the arrangements, constructions and combinations of the various elements of the structure described in the specification, claimed in the claims and illustrated in the accompanying drawings in which:

Figure 1:
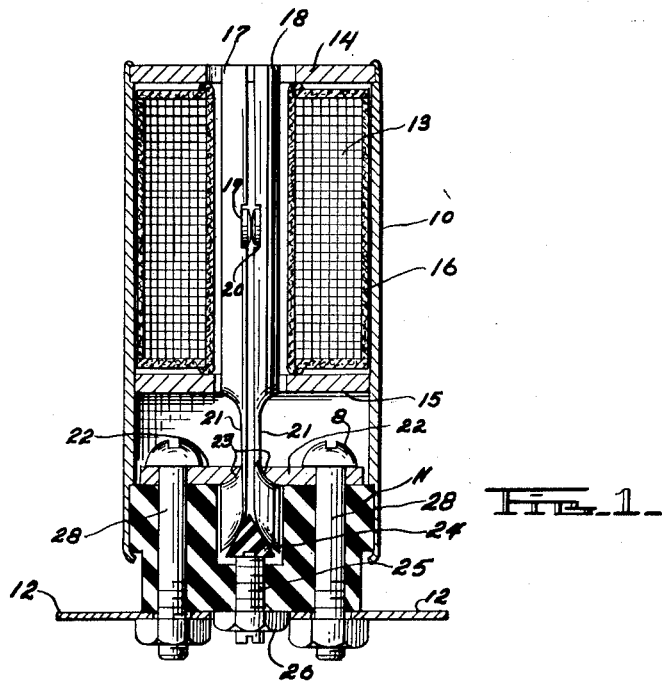
Figure 1 is a cross section of one form of my invention.

Figure 1 is an axial cross section of one form of the invention in which the regulating mechanism is shown enclosed in a cylindrical metal casing 10 which is mounted upon insulator 11 which in turn supports terminal lugs 12. The coil 13 is contained within casing 10 and is enclosed above by top 14 and on the bottom by plate 15. For reasons which will appear later, case 10, top 14, and plate 15 should be made of an iron base material. Coil 13 is isolated from the metal parts and protected from mechanical injury by insulating layer 16. Reeds 17 and 18 are mounted within coil 13 and are concentric therewith. These reeds are semicylindrical in shape for that part of their length which is inside coil 13 and have their planar sides contiguous. Reeds 17 and 18 are recessed centrally of their planar surfaces to receive contact points 19 and 20. On the side of plate 15 remote from coil 13, the convex portions of reeds 17 and 18 are cut away to leave flexible sections 21. Electrical contact is made with reeds 17 and 18 through contact plates 22 at the lower end of flexible sections 21. Contact points 22 are connected to terminal lugs 12 through bolts 28. The transition from the flexible sections 21 to the semicylindrical section is made by radius 23. Contact members 22 are cut along a similar radius at this point. The planar portion of reeds 17 and 18 at the end most remote from contact points 19 is cut away as shown in Figure 1 to accommodate adjusting cone 24. This cone is fabricated from insulating material and is mounted upon and propelled by adjusting screw 25 which is locked by lock nut 26. Bolts 28 of which four are used in each regulator (only two appear in the drawing) serve to secure the mechanism firmly together and for bringing out the necessary electrical leads.

The operation of the device shown in Figure 1 is as follows: The flow of an electrical current in coil 13 generates a magnetic flux which circulates through the reeds 17 and 18, top 14, case 10, and plate 15. The magnetic polarity of reeds 17 and 18 are similar and hence they tend to repel each other. Such repulsion of course tends to open contact points 19 which breaks a circuit controlling the excitation of the generator. This causes a decrease in voltage across coil 13 which causes a weakening of the magnetic field and permits contact points 19 to reclose. This action is repeated many times each second and closely regulates the action of the generator.

To adjust the voltage at which the control will operate, adjusting cone 24 is moved by rotating adjusting screw 25. By this means the tension exerted by contact member 22 along radius 23 can be varied at will. This invention contemplates the inclusion of a thermal compensation in the device by any one of several expedients. One or both of the reeds 17 and 18 may be made of a metal the magnetic characteristics of which vary with temperature. All or a section of coil 13 may be wound with a wire having resistance which varies in a desired fashion with changes in temperature. Instead of constructing reeds 17 and 18 of one piece, the flexible sections 21 may be made of bimetallic construction designed to yield the proper temperature compensation. Similarly, the thermal characteristics and dimensions of adjusting cone 24 may be chosen to give proper thermal compensation. Compensation may also be had by means of a thermomagnetic shunt which is arranged to shunt more or less of the magnetic flux away from the operating reeds depending upon the operating temperature. In addition to these automatic adjustments, further manual adjustments may be provided in the form of an adjustable resistance in series with the coil in the form of an adjustable magnetic shunt, or a bias magnet, or by means of an adjustable air gap in the magnetic circuit.

Figure 2:
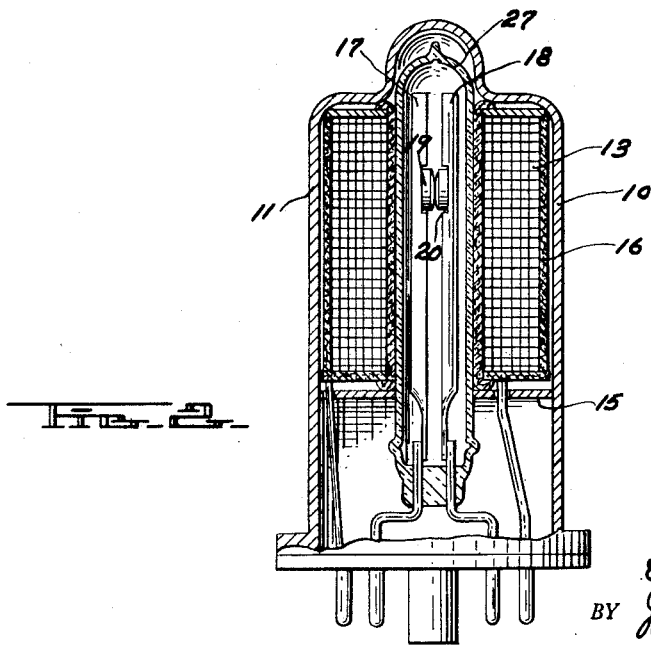
Figure 2 is a cross section of another form of my invention.

The structure shown in Figure 2 is similar to that shown in Figure 1 in principle, but is designed to be nonadjustable after assembly and to operate in an inert atmosphere. The structure is enclosed in a case 10 of magnetic material and the magnetic flux generated by coil 13 flows through case 10, plate 15 and reeds 17 and 18. Reeds 17 and 18 and contact points 19 and 20 are sealed within glass envelope 27 and preferably work in an inert gas under superatmospheric pressure. Such inert gas may conveniently be hydrogen, helium, argon, krypton, nitrogen or any other suitable inert gaseous medium. The use of such inert gas under pressure greatly minimizes arcing and inhibits the host of contact problems generated by such arcing. A sharper make and break action is also so obtained. The entire mechanism has been shown as mounted upon a standard radio octal base. Two of the base prongs are connected to coil 13 and two more to reeds 17 and 18. This structure may be plugged into a standard socket suitably mounted on the motor vehicle. By this means service of the regulator is reduced to the simple expedient of removing a suspect unit and replacing it with a new unit. The structure shown in Figure 2 may be thermally compensated or if desired made manually adjustable by any of the methods applicable to the structure formely described with the exception of that compensation dependent upon the presence of an adjusting cone.

The dependability and longevity of these two types of regulators is enhanced by the fact that the arc between the points occurs in a strong magnetic field. This, coupled with the fact that the field is continually varying, prevents the action of the arc from concentrating on a small area on the contact points due to the tendency of the magnetic field to deflect the arc. There is also a tendency of this magnetic field to blow from between the contact points particles of metal which are volatilized from the contacts by the arc.

It has been found to be advantageous to correlate the strength of the magnetic field, the mass of the vibrating reeds and the resilience of the flexible sections, so that the frequency of the system will fall between five and one hundred oscillations per second. This slow rate of vibration is sufficiently rapid to effectively regulate the voltage of the generator, and is low enough to avoid undue wear on the contact points.

While a structure has been illustrated in which the contact points are each mounted upon one of the reeds, it is to be understood that the invention comprehends those structures in which either or both of the contact points may be mounted other than on such reeds.

While the structure described has been particularly described as applied to the unit which regulates the voltage of the generator, it can readily be modified to function as the unit which regulates the current output of the generator.

I claim as my invention:

1. In an electrical regulating apparatus, a pair of co-operating contact points mounted upon a pair of solid semicylindrical contact reeds having a convex and a planar surface, said reeds being arranged coaxially with a magnetic field so that the magnetic field magnetizes the reed with like poles adacent and causes the reeds to repel each other, said contact points being mounted upon and recessed into the planar surfaces of the reeds.

2. In an electrical regulating apparatus, a pair of co-operating contact points mounted upon a pair of semicylindrical contact reeds having a convex and a planar surface, a portion of whose convex surface has been cut away to provide a flexible section, said reeds being arranged coaxially with a magnetic field so that the magnetic field magnetizes the reed with like poles adjacent and causes the reeds to repel each other, said contact points being mounted upon and recessed into the planar surfaces of the reeds.

3. In an electrical regulating apparatus, a pair of co-operating contact points mounted upon a pair of semicylindrical contact reeds having a convex and a planar surface, a portion of whose convex surface has been cut away to provide a flexible section, said reeds being arranged coaxially with a magnetic field so that the magnetic field magnetizes the reed with like poles adjacent and causes the reeds to repel each other, said contact points being mounted upon and recessed into the planar surfaces of the reeds, and said reeds and contact points being hermetically sealed into a gas-tight envelope filled with an inert gas under superatmospheric pressure.

4. The structure recited in claim 3 in which the regulating apparatus is mounted upon a detachable base.

RICHARD D. BREWER.

REFERENCES CITED

The following references are of record in the file of this patent:

UNITED STATES PATENTS

| Number | Name | Date |
| --- | --- | --- |
| 364,619 | Woods | June 7, 1887 |
| 1,185,240 | Petersen | May 30, 1916 |
| 1,876,295 | Hofgaard | Sept. 6, 1932 |
| 2,029,266 | Leece et al. | Jan. 28, 1936 |
| 2,264,746 | Ellwood | Dec. 2, 1941 |
| 2,286,800 | Gustin | June 16, 1942 |
| 2,289,830 | Ellwood | July 14, 1942 |
| 2,356,791 | Huetten | Aug. 29, 1944 |

FOREIGN PATENTS

| Number | Country | Date |
| --- | --- | --- |
| 271,235 | Great Britain | May 26, 1927 |
| 536,695 | Great Britain | May 23, 1941 |